US012794608B2

(12) United States Patent
Nammi

(10) Patent No.: US 12,794,608 B2
(45) **Date of Patent: *Nov. 10, 2026**

(54) REFERENCE SIGNAL TRANSMISSION SCHEME FOR NON-ORTHOGONAL MULTIPLE ACCESS SYSTEMS

(71) Applicant: AT&T Intellectual Property I, L.P., Atlanta, GA (US)

(72) Inventor: SaiRamesh Nammi, Kista (SE)

(73) Assignee: AT&T Intellectual Property I, L.P., Atlanta, GA (US)

( * ) Notice: Subject to any disclaimer, the term of this patent is extended or adjusted under 35 U.S.C. 154(b) by 292 days.

This patent is subject to a terminal disclaimer.

(21) Appl. No.: 18/762,790

(22) Filed: Jul. 3, 2024

(65) Prior Publication Data

US 2024/0356689 A1 Oct. 24, 2024

Related U.S. Application Data

(63) Continuation of application No. 17/654,137, filed on Mar. 9, 2022, now Pat. No. 12,058,058, which is a (Continued)

(51) Int. Cl.
*H04W 72/12* (2023.01)
*H04B 1/69* (2011.01)
(Continued)

(52) U.S. Cl.
CPC ............. *H04L 5/0005* (2013.01); *H04B 1/69* (2013.01); *H04L 5/0048* (2013.01);
(Continued)

(58) Field of Classification Search
CPC .... H04L 5/0005; H04L 5/0048; H04W 72/21; H04W 72/12; H04W 72/044; H04B 1/69
See application file for complete search history.

(56) References Cited

U.S. PATENT DOCUMENTS

2013/0265955 A1 10/2013 Kim et al.
2016/0066345 A1 3/2016 Sun et al.
(Continued)

FOREIGN PATENT DOCUMENTS

JP 2016067047 A 4/2016
WO 2017028691 A1 2/2017
(Continued)

OTHER PUBLICATIONS

"Final Office Action received for U.S. Appl. No. 16/103,134", Sep. 11, 2020, 26 Pages.
(Continued)

*Primary Examiner* — Marcus Smith
*Assistant Examiner* — Zhaohui Yang
(74) *Attorney, Agent, or Firm* — Guntin & Gust, PLC; Kenneth S. Kwan

(57) ABSTRACT

The disclosed subject matter relates to techniques for transmitting reference signals in non-orthogonal multiple access (NOMA) communication protocols. In one embodiment, a method comprises determining a demodulation reference signal (DMRS) for use by a group of mobile devices in association with uplink data transmissions, wherein respective mobile devices of the group of mobile devices are configured to employ a same time and a same frequency resource of a wireless communication network in association with communicating with network devices of the wireless communication network according to a NOMA communication protocol. The method further comprises determining different configuration parameters for application by the respective mobile devices in association with transmitting the DMRS with the uplink data transmissions, wherein the different configuration parameters facilitate differentiating between the DMRS as transmitted by the respective mobile devices. The method further comprises
(Continued)

sending the DMRS and the different configuration parameters to the respective mobile devices.

20 Claims, 14 Drawing Sheets

Related U.S. Application Data continuation of application No. 16/103,134, filed on Aug. 14, 2018, now Pat. No. 11,303,399.

(60) Provisional application No. 62/670,505, filed on May 11, 2018.

(51) Int. Cl.
*H04L 5/00* (2006.01)
*H04W 72/21* (2023.01)
*H04W 72/044* (2023.01)

(52) U.S. Cl.
CPC ........... *H04W 72/12* (2013.01); *H04W 72/21* (2023.01); *H04W 72/044* (2013.01)

(56) References Cited

U.S. PATENT DOCUMENTS

| | | | | |
|---|---|---|---|---|
| 2016/0112995 | A1 | 4/2016 | Chen | |
| 2017/0012754 | A1 | 1/2017 | Sun et al. | |
| 2017/0195096 | A1 | 7/2017 | Yamamoto et al. | |
| 2017/0318411 | A1* | 11/2017 | Yamamoto | H04B 7/066 |
| 2017/0331573 | A1 | 11/2017 | Li | |
| 2018/0069644 | A1 | 3/2018 | Zhu et al. | |
| 2018/0076993 | A1 | 3/2018 | Seo et al. | |
| 2019/0013977 | A1 | 1/2019 | Harrison et al. | |
| 2019/0159153 | A1 | 5/2019 | Li et al. | |
| 2019/0159193 | A1 | 5/2019 | Zhang et al. | |
| 2019/0223225 | A1 | 7/2019 | Lee et al. | |
| 2019/0245640 | A1 | 8/2019 | Yoshimoto et al. | |
| 2019/0245664 | A1* | 8/2019 | Kim | H04L 5/0037 |
| 2020/0053789 | A1 | 2/2020 | Lee et al. | |

FOREIGN PATENT DOCUMENTS

| | | | |
|---|---|---|---|
| WO | 2018030764 | A1 | 2/2018 |
| WO | 2018031620 | A1 | 2/2018 |
| WO | 2018032014 | A1 | 2/2018 |
| WO | 2018064313 | A1 | 4/2018 |

OTHER PUBLICATIONS

"International Search Report and Written Opinion received for PCT Application Serial No. PCT/US2019/030710", Jul. 4, 2019, 14 Pages.

"Non-Final Office Action received for U.S. Appl. No. 16/103,134", Jun. 10, 2021, 29 Pages.

"Non-Final Office Action received for U.S. Appl. No. 16/103,134", Mar. 18, 2020, 31 Pages.

* cited by examiner

REFERENCE SIGNAL TRANSMISSION SCHEME FOR NON-ORTHOGONAL MULTIPLE ACCESS SYSTEMS

RELATED APPLICATIONS

This patent application is a continuation of U.S. patent application Ser. No. 17/654,137, filed Mar. 9, 2022, entitled "REFERENCE SIGNAL TRANSMISSION SCHEME FOR NON-ORTHOGONAL MULTIPLE ACCESS SYSTEMS," which is a continuation of Ser. No. 16/103,134, filed Aug. 14, 2018, entitled "REFERENCE SIGNAL TRANSMISSION SCHEME FOR NON-ORTHOGONAL MULTIPLE ACCESS SYSTEMS," (now U.S. Pat. No. 11,303,399), which applications each claim the benefit of priority to U.S. Provisional Patent Application No. 62/670,505, filed May 11, 2018, and entitled "REFERENCE SIGNAL TRANSMISSION SCHEME FOR NON-ORTHOGONAL MULTIPLE ACCESS SYSTEMS," the entireties of which priority applications are incorporated herein by reference.

TECHNICAL FIELD

The disclosed subject matter relates to techniques for transmitting reference signals in non-orthogonal multiple access (NOMA) communication schemes or protocols.

BACKGROUND

To meet the huge demand for data centric applications, Third Generation Partnership Project (3GPP) systems and systems that employ one or more aspects of the specifications of the Fourth Generation (4G) standard for wireless communications are being extended to a Fifth Generation (5G) standard for wireless communications, also referred to as New Radio (NR) access. Compared to existing 4G technologies, 5G is targeting much higher throughput with low latency and utilizing higher carrier frequencies and wider bandwidths, at the same time reducing energy consumption and costs. The first release of 5G wireless communication standards schedules users on orthogonal resources for downlink and uplink data transmission. This implies that the network node (e.g., a base station (BS), gNodeB, eNodeB, etc.) allocates the user equipment (UE) on different time/frequency resources to prevent transmission interference. However, work is ongoing to improve the NR uplink performance by allocating non-orthogonal resources.

DETAILED DESCRIPTION

Figure 1:
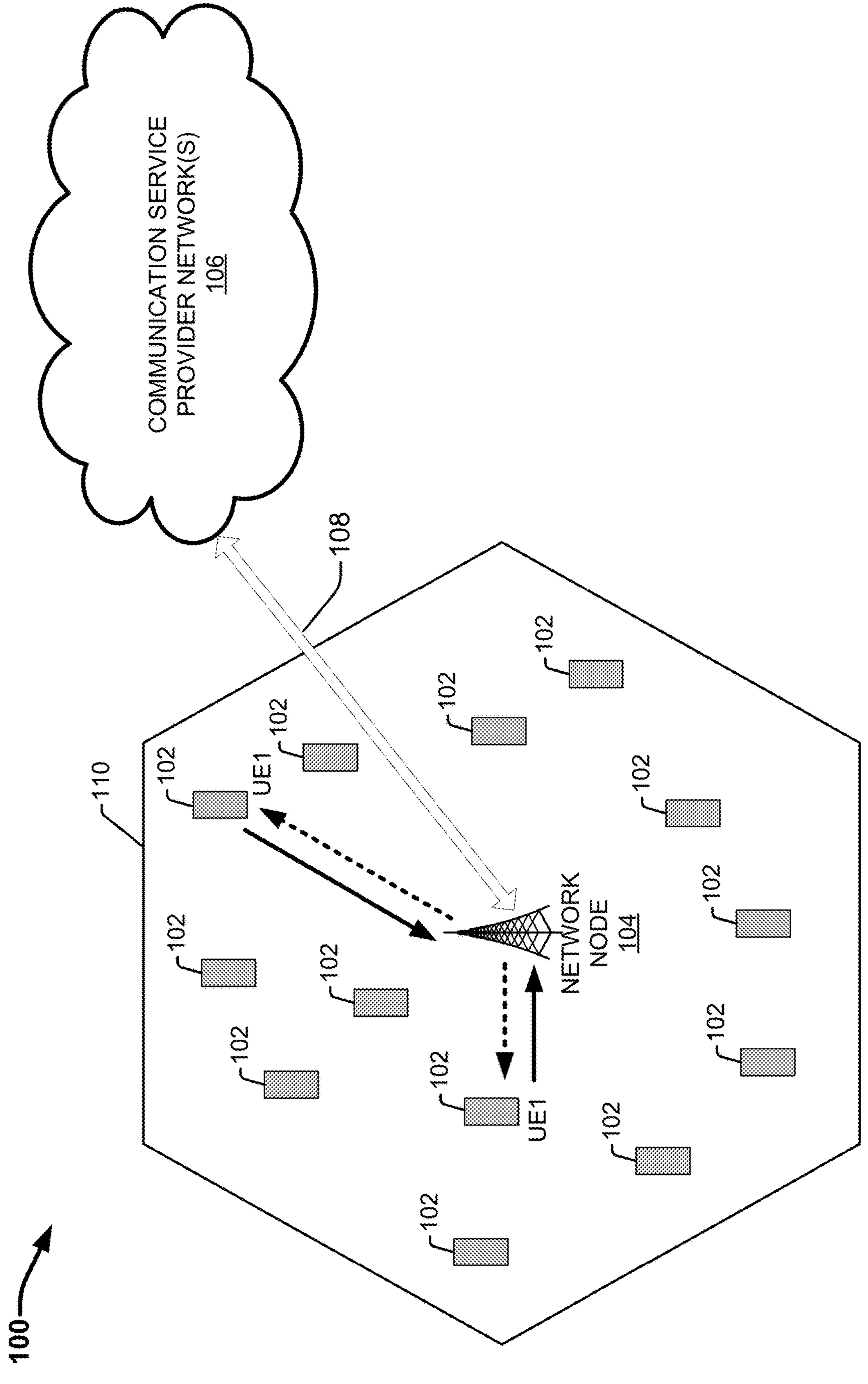
FIG. 1 is an illustration of an example wireless communication system that facilitates NOMA communication schemes in accordance with various aspects and embodiments of the subject disclosure.

The following detailed description is merely illustrative and is not intended to limit embodiments and/or application or uses of embodiments. Furthermore, there is no intention to be bound by any expressed or implied information presented in the preceding sections or in the Detailed Description section.

The subject disclosure is directed to computer processing systems, computer-implemented methods, apparatus and/or computer program products that facilitate improving the uplink performance of non-orthogonal multiple access (NOMA) communication schemes or protocols in terms of capacity for 5G wireless communication systems. The first release of new radio (NR) schedules users on orthogonal resources for downlink and uplink data transmission. This implies that the gNode B allocates the UEs on different time-frequency resources such that during transmission, these signals from the UE don't interfere and the network is able to decode the signals. However, work is ongoing in 3GPP to improve the NR uplink performance by allocating non-orthogonal resources in accordance with communication schemes referred to as NOMA.

The fundamental idea of NOMA is to simultaneously serve multiple users over the same spectrum resources at the expense of inter-user interference. In this regard, contrary to orthogonal multiple access (OMA) communication schemes or protocols, with NOMA a single gNode B (or base station (BS) similar type of network node) can schedule more than one UE on the same time-frequency resources by exploiting their respective channel gain differences. Successive interference cancelation (SIC) is applied at the receiver ends for inter-user interference cancelation.

NOMA schemes use the code domain for multiple access, where different users are served with different spreading codes in the code domain. The users are differentiated at the receiver end by their respective spreading codes. The users with better channel conditions employ interference cancellation to remove the messages intended for other users before decoding their own. The spreading codes can be taken from Hadamard family of codes, codes which satisfy the Welch bound etc.

As compared to OMA, NOMA communication schemes offer higher spectral efficiency due to use of multiple UEs on the same time/frequency resources. NOMA also offers higher connectivity by serving clusters of a plurality (e.g., two or more) UEs simultaneously. In general, these capacity gains afforded by NOMA are high when the load of the cell (or BS serving the cell) is high, as it is easier to pair UEs within a cluster when the number of UEs in the cell is high. However, current NOMA schemes are restricted by the 5G specification which limits the pairing of UEs and further limits the number of available demodulation reference signal (DMRS) patterns that can be used to 12. In this regard, current NOMA schemes provide gains by multiplexing the UEs on the same resources when the number of DMRSs are orthogonal. Accordingly, the number of UEs the BS can schedule to a same time/frequency resource block is capped, which limits the capacity of NOMA systems. Accordingly, even if the number of UEs in a cell may be very high, the BS can't schedule many of the UEs to the same time/frequency resources to accommodate all the UEs, because the number of DMRSs are limited. One way to increase the capacity of NOMA systems is to increase the DMRS design patterns to more than 12. However, this would require a new 5G DMRS design which may interfere with the data channels, thereby reducing the gains of NOMA system making the NOMA system unattractive.

The subject disclosure provides new techniques for transmitting DMRSs in NOMA schemes to improve the performance of 5G systems for uplink data transmission. In one or more embodiments, when NOMA is employed, the available DMRSs can be spread in accordance with different spreading codes used by the respective UEs and mapped to the shared resource elements such that they are partially orthogonal or completely orthogonal, thereby allowing for the reuse of the same DMRS over multiple resources. In accordance with these embodiments, a single DMRS can be used for two or more UEs by spreading the single DMRS before resource mapping in accordance with different spreading codes determined for the respective UEs, wherein the spreading codes used for the DMRS by each UE results in the DMRS being orthogonal or partially orthogonal.

In another embodiment, the network node can use a single DMRS for two or more UEs by mapping the DMRS for each UE to a different resource element configuration within a same time slot or symbol position. The different resource element configurations can use different frequency ports within the same time/frequency resource block and symbol position such that resources are shared but the DMRS ports used are orthogonal or substantially orthogonal. For example, assuming two UEs, referred to as UE1 and UE2, are scheduled to a shared resource block comprising 12 resource elements (e.g., 12 rows in the frequency domain), and 14 symbols (e.g., 14 columns in the time domain). A first resource element configuration referred to herein as Type-1, can use 6 resource elements at symbol position 3 and resource element positions 12, 10, 8, 6, 5 and 2. Another second resource element configuration, referred to herein as Type-1, can use 4 resource elements at symbol position 3 and resource element positions 12, 11, 6 and 5. According to this example, the network node can schedule UE1 with a DMRS using the first resource element configuration of Type-1, and schedule the second UE2 with the same DMRS using the second resource element configuration of Type-2. In accordance with this embodiment, the frequencies used for the same DMRS by two or more UEs can be changed such that orthogonal or substantially orthogonal DMRS ports are used.

In yet another embodiment, the network node can reuse a single DMRS for two or more UEs scheduled to shared resources in accordance with a NOMA communication protocol by configuring the first symbol position of DMRS of UE1 different compared to the DMRS of UE2 such that DMRS interference is very minimal. For example, assuming two UEs, referred to as UE1 and UE2, are scheduled to a shared resource block comprising 12 resource elements (e.g., 12 rows in the frequency domain), and 14 symbols (e.g., 14 columns in the time domain), the network node can map the DMRS symbols for UE1 to symbol column 3 and map the DMRS symbols for UE2 to symbol column 4.

Still in yet another embodiment, rather than spreading the DMRS symbols before resource mapping, the network node can multiply the DMRS symbols by an orthogonal code of length 2, 4, 8, 16 etc. such that the codes are orthogonal. In this way, two or more UEs can use a same DMRS, yet with symbols multiplied by a different code length. With this embodiment, a single DMRS can be extended to accommodate many users.

The disclosed techniques involve applications at both the BS (the transmitter), and the UE (the receiver). For example, in one or more embodiments, the BS can be configured to determine the manner for sharing a same DMRS signal between two or more UEs in accordance with the various techniques described herein (e.g., spreading before mapping, using different resource element configurations, using different symbol positions for the DMRS, and/or multiplying the DMRS symbols by different orthogonal codes). The BS can further instruct the UE to employ the determined spreading/mapping scheme to transmit the DMSR ins subsequent uplink transmissions. For example, in accordance with one embodiment, the BS can determine the spreading factors for the DMRS and the spreading codes for the data traffic to be used by respective paired UEs on a shared time/frequency resource. The BS can further provide the respective UEs with their determined spreading factors and spreading codes. Based on receiving a spreading factor and spreading code, a UE can be configured to adapt its transmission scheme accordingly. In this regard, the UE can be configured to code uplink transmissions by spreading the DMRS according to the spreading factor and spreading the uplink data spreading code.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. The terms scheme, protocol, configuration and the like, are used interchangeably throughout the specification in various contexts to refer to a defined manner for formatting, transmitting or receiving information.

FIG. 1 is an illustration of an example wireless communication system 100 that facilitates NOMA communication schemes in accordance with various aspects and embodiments of the subject disclosure. System 100 can comprise a plurality of UEs 102 and a radio network node 104. The non-limiting term user equipment (UE) is used herein to refer to any type of wireless device that can communicate with a radio network node in a cellular or mobile communication system. Some examples UEs can include but are not limited to, a target device, a device to device (D2D) UE, a machine type UE or UE capable of machine to machine (M2M) communication, a portable digital assistant (PDA), a tablet personal computer (PC), a mobile terminal, a smart phone, a laptop, a laptop embedded equipped (LEE), a laptop mounted equipment (LME), USB dongles, a wearable device, a virtual reality (VR) device, a heads-up display (HUD) device, a smart car, and the like. In one or more embodiments, the respective UEs 102 can include two or more antennas (not shown) thereby supporting multiple-input and multiple output (MIMO) communications in association with NOMA and OMA communication schemes. The number of antennas provided on a UE 102 can vary (e.g., from two to hundreds or more to accommodate massive MIMO systems).

In the embodiment shown, system 100 is or includes a wireless communication network serviced by one or more wireless communication network providers. The UEs 102 can be communicatively coupled to the wireless communication network via the network node 104. In this regard, a UE 102 can send and/or receive communication data via a wireless link to the network node 104. The dashed arrow lines from the network node 104 to example UE1 and example UE2 represent downlink communications and the solid arrow lines represent uplink communication. It should be appreciated that these arrow lines are merely provided to demonstrate wireless communication links between a UE and the network node 104. In this regard, although arrowed lines are not drawn for every depicted UE 102, it should be appreciated that all depicted UEs can wirelessly communicate with the network node 104 using uplink and downlink communications.

The non-limiting term network node (or radio network node) is used herein to refer to any type of network node serving a UE 102 and/or connected to another network node, network element, or another network node from which the UE 102 can receive a radio signal. Examples of network nodes (e.g., network node 104) can include but are not limited to: a base station (BS) device, a Node B device, a multi-standard radio (MSR) device (e.g., an MSR BS), a gNodeB device, an eNode B device, a network controller device, a radio network controller (RNC) device, a base station controller (BSC) device, a relay device, a donor node device controlling relay, a base transceiver station (BTS) device, an access point (AP) device, a transmission point device, a transmission node, an RRU device, an RRH device, node devices in distributed antenna system (DAS), and the like. In accordance one or more embodiment, the network node 104 can include two or more antennas to support various MIMO and/or massive MIMO communications in association with NOMA and OMA communication schemes.

System 100 can further include one or more communication service provider networks 106 that facilitate providing wireless communication services to various UEs, including UE 102, via the network node 104 and/or various additional network devices (not shown) included in the one or more communication service provider networks 106. In the embodiment shown, the area defined by the hexagon indicates a single wireless network cell 110 serviced by the network node 104. It should be appreciated however that system 100 can include a plurality of cells respectively serviced by network nodes that are respectively communicatively coupled to the one or more communication service provider networks 106. In this regard, the one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation.

Although the subject disclosure is directed to systems employing 5G or NR communications technologies, it should be appreciated that system 100 can employ various wireless communication technologies to facilitate wireless radio communications between devices (e.g., the UE 102 and the network node 104). In this regard, the disclosed techniques for optimizing the capacity of NOMA communication schemes can be applied to any RAT or multi-RAT system where the UE operates using multiple carriers, such as but not limited to: long term evolution (LTE), frequency division duplex (FDD), time division duplex (TDD), FDD/TDD, wideband code division multiple access (WCMDA), high speed packet access (HSPA), WCMDA/HSPA, global system for mobile communication (GSM), 3GGP, GSM/3GGP, Wi Fi, WLAN, WiMax, CDMA2000, and the like. One or more embodiments of the disclosed reference signal transmission techniques are also applicable to single carrier as well as to multicarrier (MC) or carrier aggregation (CA) operation of the UE 102. The term carrier aggregation (CA) is also called (e.g., interchangeably called) "multi-carrier system", "multi-cell operation", "multi-carrier operation", "multi-carrier" transmission and/or reception. It is noted that the solutions outlined equally applies for Multi RAB (radio bearers) on some carriers (that is data plus speech is simultaneously scheduled). Similarly, the solutions are applicable where some UEs 102 are scheduled using eMBB, some UEs 102 are scheduled using URLLC, and some UEs 102 are using mMTC applications.

In one or more embodiments, the devices (e.g., the UEs 102 and the network node 104) of system 100 can be configured to employ both OMA and NOMA communication schemes. In this regard, the network node 104 can be configured to dynamically schedule one or more UEs 102 on orthogonal resources or non-orthogonal resources for downlink and uplink data transmission depending on network conditions. For example, in some implementations, when the load on the network node 104 is low, meaning the number of UEs 102 serviced by the network node 104 in the cell 110 is low (e.g., relative to a defined load threshold), the network node 104 can schedule one or more of the UEs 102 on orthogonal resources (e.g., using OMA). In some scenarios when the load on the network node 104 increases (e.g., relative to a defined load threshold) and network resources become limited, the network node 104 can schedule two or more of the UEs 102 using non-orthogonal resources (e.g., using NOMA). In this regard, the network node 104 can schedule two or more UEs 102 on the same time/frequency resources to increase the network capacity. With NOMA, two or more UEs 102 can be scheduled on a same time/frequency resource by using differences in power levels of the respective UEs 102 to differentiate between the UE signals at the receiver end.

The benefits of using NOMA can be illustrated by the following example with reference to system 100. A UE that is close to the cell edge, such as UE1 in system 100, generally experiences poor channel conditions due to the distance between the UE 102 and the network node 104. In this regard, in general the greater the distance of a UE 102 from its connected network node 104 the poorer the channel conditions. If the UE1 and the network node 104 were to employ an OMA communication scheme, the network node 104 would allocate an orthogonal bandwidth channel, (e.g., a time slot), to UE1, and the other UEs in the cell 110 cannot use this bandwidth channel. The key idea of NOMA is to add another UE with a better channel condition (e.g., closer to the network node 104), such as UE2 in system 100, into this same bandwidth channel. According, if the UE1 and the network node 104 were to employ a NOMA communication scheme, the network node 104 could allocate UE1 and two or more additional UEs 102 to a non-orthogonal bandwidth channel. For example, since UE1's channel condition is very poor, when UE1 and UE2 are scheduled to the same time/frequency slot, the interference from UE2 will not cause much performance degradation to UE1, but the overall system throughput can be significantly improved since additional information can be delivered between the network node 104 and UE2.

In accordance with various embodiments, system 100 can employ a NOMA communication scheme that differentiates UEs scheduled to a same time/frequency resource using code domain spreading, wherein different UEs can use different spreading codes for traffic differentiation. Accordingly, the network node 104 can schedule two (or more) UEs 102 to a same domain time/frequency domain, yet differentiate between them by their respective spreading codes. On the receiver side, the UE with better channel conditions can employ interference cancelation to remove the messages intended for other UEs before decoding their own. In some implementations, the spreading codes can be taken from Hadamard family of codes, codes which satisfy the Welch bound, and the like.

The number of UEs 102 that can be paired to single bandwidth channel (e.g., time/frequency resource) in conventional NOMA schemes is restricted by the limited number of DMRSs. In particular, the 5G specification provides only 12 DMRS options. Demodulation reference signals (DMRSs) are a type of predefined uplink reference signals transmitted by the UE 102 to the network node 104. Each DMRS transmitted by a UE occupies specific resource elements within the uplink time/frequency grid. These reference signals are specifically intended to be used by the network node 104 for channel estimation for data channel between a UE 102 and the network node 104. The DMRSs are specific to individual UEs 102. In this regard each DMRS transmitted by a specific UE 102 is intended for channel estimation by the network node 104 from the specific UE 102. That specific reference signal is then only transmitted within the resource blocks assigned for data traffic channel transmission to that UE. Since in general the data traffic is pre-coded, the DMRS is also pre-coded with the same precoding as that of the traffic data.

NOMA provides gains by multiplexing the UEs on the same resources when the number of DMRSs are orthogonal. One way to increase the capacity of NOMA systems is to increase the DMRS design patterns to more than 12. However, this requires a new design and some of the designs might interfere with the data channels, thereby reducing the gains of NOMA system making the NOMA system unattractive. Various embodiments of the disclosed subject matter are directed to techniques for reusing the 12 DMRS design patterns in unique ways such that a single DMRS design pattern can be shared by two or more UEs scheduled to the same time/frequency resources in accordance with OMA, thereby improving the performance of 5G systems for uplink data transmission. The disclosed techniques provide significant improvements in terms of system capacity by allowing more users to be multiplexed on the same resources relative to conventional OMA techniques (wherein the 12 DMRS design patterns are not shared by two or more UEs scheduled to the same resources). The disclosed techniques further provided for dynamically optimizing system performance as the users are switched between NOMA and OMA based on network conditions and capacity demands. Further, the disclosed techniques use a compact downlink control channel to indicate, by the network node to the UE, which transmission scheme (e.g., NOMA or OMA) and DMRS configuration to use for uplink transmissions, thereby reducing the overhead of the control channel.

In accordance with one or more embodiments, in order to schedule more UEs to the same time/frequency resources than the amount restricted by the limited number of defined DMRSs (e.g., which is 12 according to the 5G specification), the network node 104 can spread the DMRSs for the UEs such that they are partially orthogonal or completely orthogonal, thereby reusing the same DMRS over multiple resources. In this regard, the network node 104 can be configured to determine a spreading scheme for a DMRS that spreads the same DMRS between two or more UEs but maps the DMRS to the same resource elements shared by the two or more UEs.

As an example, in one or more embodiments the network node 104 can be configured to determine or generate a DMRS, denoted as r(n), according to the following Equation 1, wherein the pseudo-random sequence c(i) is defined in clause 5.2.1. of the 5G specification:

$$r(n) = \frac{1}{\sqrt{2}}(1 - 2 \cdot c(2n)) + j\frac{1}{\sqrt{2}}(1 - 2 \cdot c(2n + 1)). \quad \text{Equation 1}$$

In accordance with this example, the pseudo-random sequence generator can be initialized with in accordance with Equation 2:

$$c_{init} = \left(2^{17}\left(N_{symb}^{slot} n_{s,f}^{\mu} + l + 1\right)\left(2N_{ID}^{n_{SCID}} + 1\right) + 2N_{ID}^{n_{SCID}} + n_{SCID}\right) \bmod 2^{31}. \quad \text{Equation 2}$$

In Equation 2, 1 is the OFDM symbol number within the time/frequency slot, and $$n_{s,f}^{\mu}$$

is the slot number within a frame. In some implementations, in Equation 2, $$n_{SCID} \in \{0, 1\} \text{ and } N_{ID}^{0}, N_{ID}^{1} \in \{0, 1, \ldots , 65535\}$$

can be determined by the higher-layer parameters scrambling ID0 and scrambling ID1, respectively, in the DMRS-UplinkConfig IE (if provided), and the physical uplink shared channel (PUSCH) is not a msg3 PUSCH according to clause 8.3 in the 5G specification [5, TS 38.213]. In addition, $$n_{SCID} = 0 \text{ and } N_{ID}^{0} \in \{0, 1, \ldots , 65535\}$$

can be determined by the higher-layer parameter scrambling ID0 in the DMRS-UplinkConfig IE, (if provided) and the PUSCH can be scheduled by DCI format 0_0 with the CRC scrambled by C-RNTI.

Figure 3:
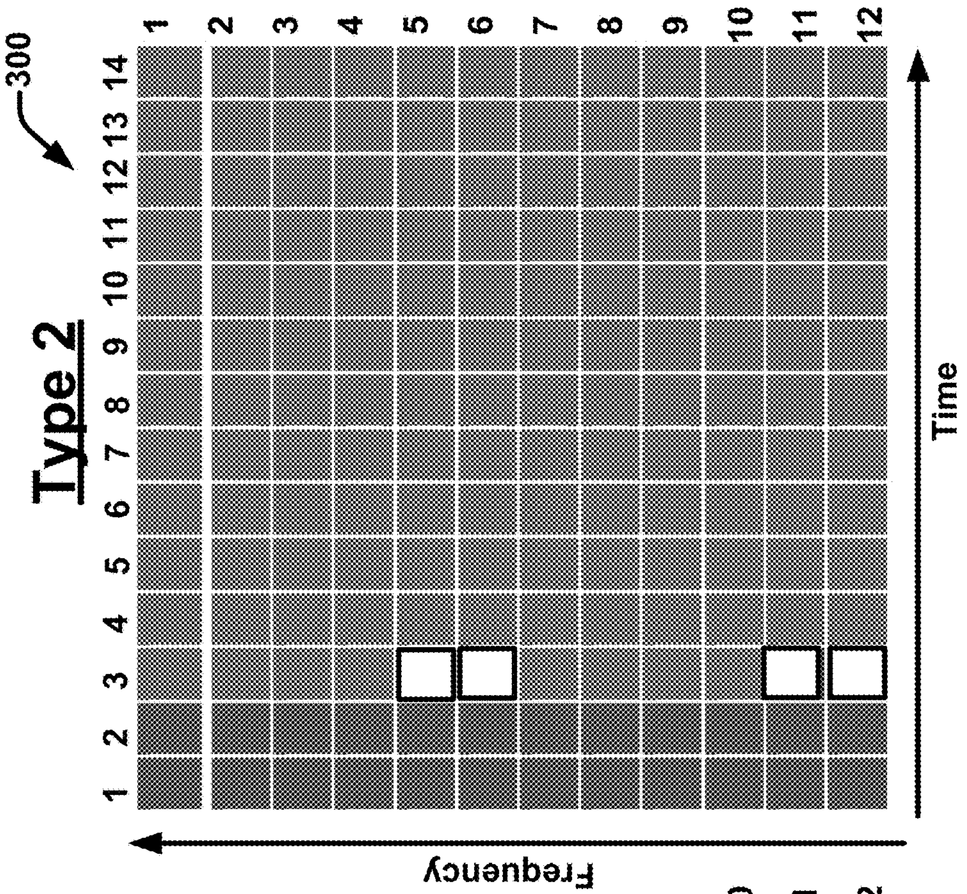
FIG. 3 is an illustration of another example resource block mapping scheme for demodulation reference signals (DMRS)s in accordance with various aspects and embodiments of the subject disclosure.
Figure 2:
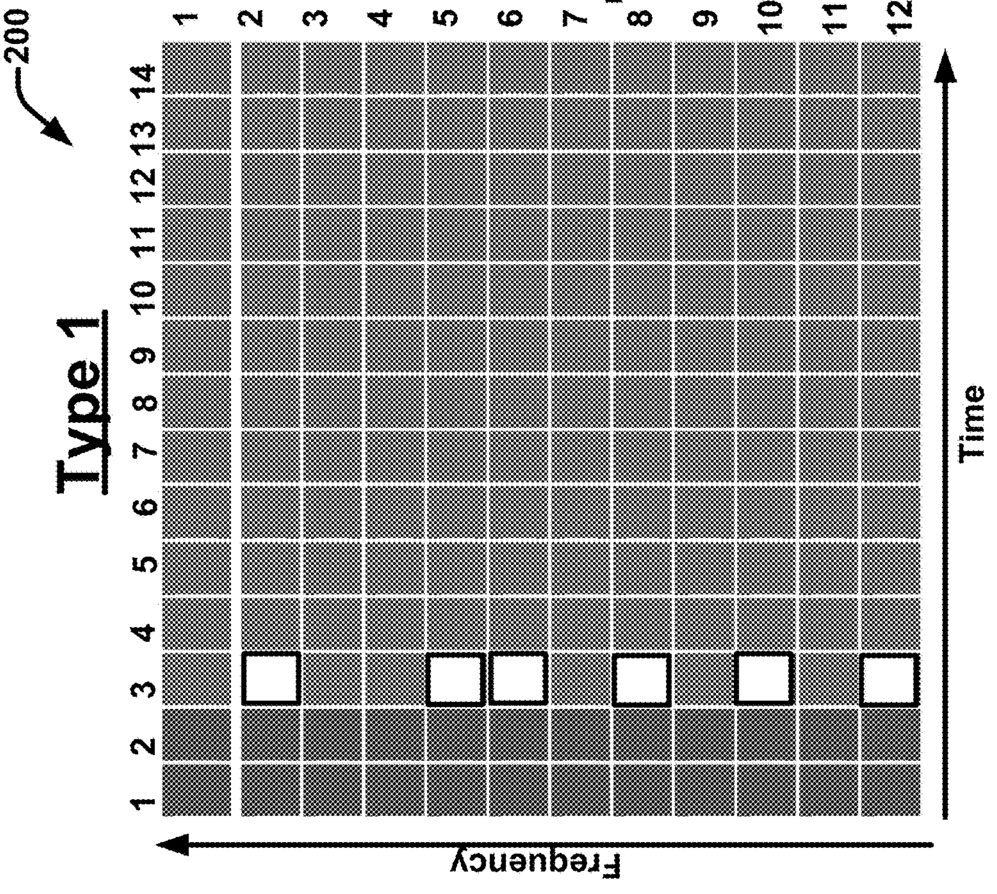
FIG. 2 is an illustration of an example resource block mapping scheme for demodulation reference signals (DMRS)s in accordance with various aspects and embodiments of the subject disclosure.

FIGS. 2 and 3 illustrate example resource block mapping schemes for a single DMRS in accordance with various aspects and embodiments of the subject disclosure. In FIGS. 2 and 3, the white boxes correspond to the DMRS. In this regard, FIGS. 2 and 3 respectively depict resource blocks 200 and 300 defined by 12 rows in the frequency domain and 14 symbols (e.g., 14 columns) in the time domain. Each individual block (e.g., small square corresponding to a cell in a table) represents a resource element. The first two columns or symbol positions can be used for the control channel. In both FIG. 2 and FIG. 3, the DMRS, represented by the white blocks, is mapped two different resource elements located at symbol position 3 (e.g., in the same time domain slot). However, the resource element configuration shown in FIG. 2, referred to herein as configuration Type-1, varies from the resource element configurations shown in FIG. 3, referred to herein as configurations Type-2, with respect to the frequency domain. For example, as shown in FIG. 2, the DMRS reference signal is mapped to the resource elements a frequency ports or frequency positions 12, 10, 8, 6, 5 and 2. As shown in FIG. 3, in accordance with the Type-2 configuration, the DMRS reference signal is mapped to the resource elements a frequency ports or frequency positions 12, 11, 6 and 5.

The manner in which the network node 104 facilitates sharing or configuring shared used of a single DMRS between two or more UEs sharing at least some overlapping resources within the same time/frequency domain (e.g., using a same resource block, such as resource block 200 or 300, or at least partially overlapping resource blocks), can vary. FIGS. 4-9 respectively present demonstrate different techniques for reusing a same DMRS signal for two or more UEs in accordance with various aspects and embodiments of the subject disclosure. Although FIGS. 4-9 respectively present different techniques for reusing a same DMRS between two or more UEs participating in a NOMA communication protocol, in various embodiments, two or more techniques described with reference to FIGS. 4-9 can be combined. Repetitive description of like elements employed in respective embodiments is omitted for sake of brevity.

Figure 4:
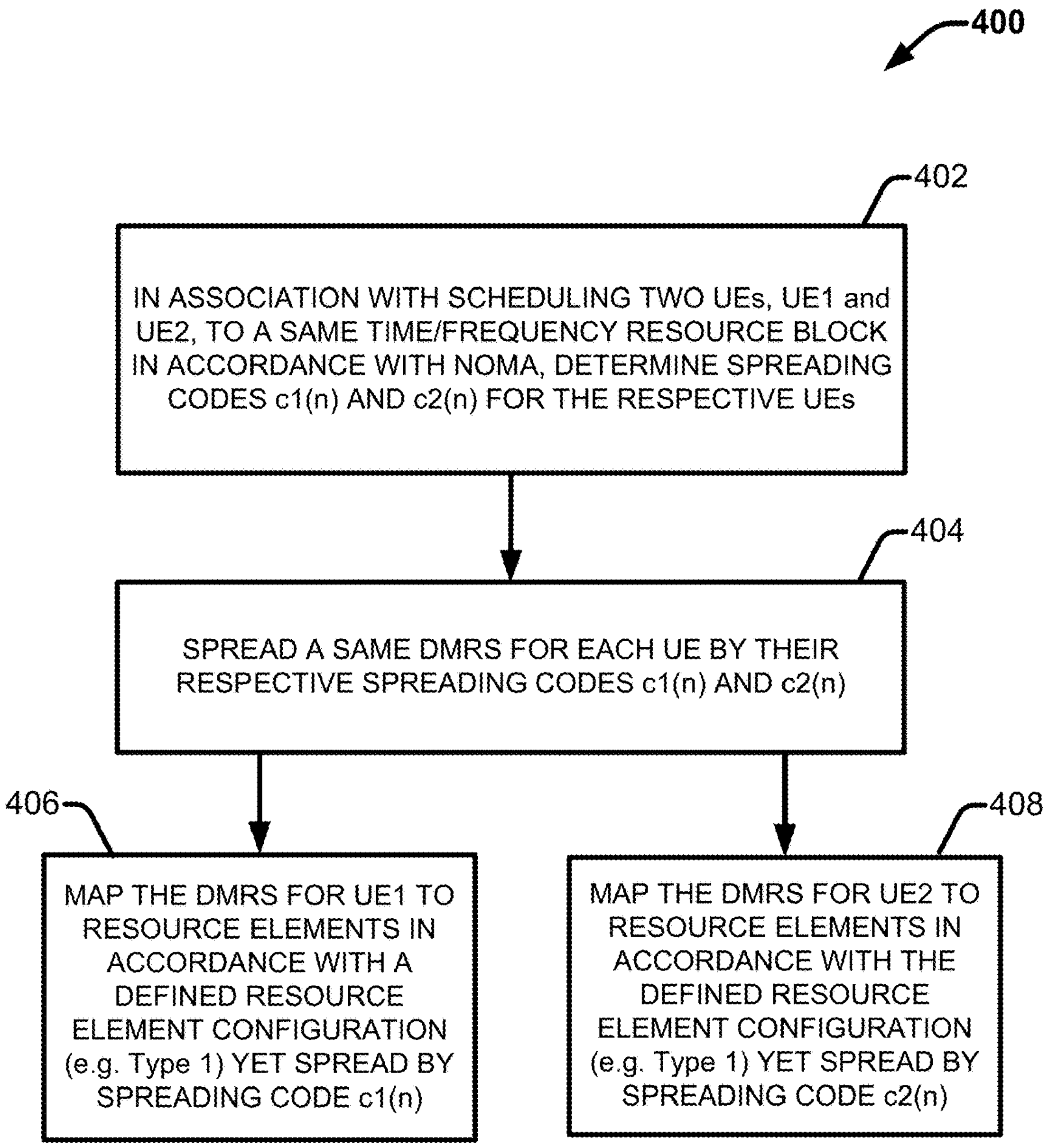
FIG. 4 presents a high-level flow diagram of an example method for reusing a same DMRS signal for two or more UEs while minimizing signal interference in accordance with a NOMA communication scheme, in accordance with various aspects and embodiments of the subject disclosure.

With reference to FIG. 4, presented is an example method 400 for sharing a same DMRS between two or more UEs by spreading the DMRS in accordance with different spreading codes determined for the respective UEs prior to mapping the DMRS to the same shared resource elements shared between two or more UES. For example, at 402, in association with scheduling two UEs, respectively referred to as UE1 and UE2, to a same time/frequency resource block in accordance with NOMA, the network node (e.g., network node 104) can determine different spreading codes c1(*n*) and c2(*n*) for the respective UEs (e.g., in accordance with Equations 1 and Equation 2 above). In particular, the network node can determine the respective spreading codes for each UE such that the respective spreading codes c1(*n*) and c2(*n*) are orthogonal or substantially orthogonal. At 404, the network node can further spread the same DMRS for each UE (e.g., UE1 and UE2) by their respective spreading codes. Then at 406, the network node can map the DMRS for UE1 to the resource elements in accordance with a defined resource element configuration (e.g., configuration Type-1 for example), yet spread by the spreading code c1(*n*). At 408, the network node can map the DMRS for UE2 to the same resource elements in accordance with the same defined resource element configuration, yet spread by the spreading code c2(*n*). As a result, cross correlation between c1(*n*) and c2(*n*) will be very low. By way of example with reference to FIGS. 2 and 3, both UEs can employ the same resource element configuration, either Type-1 or Type-2, for example, and share the exact same resource elements in both the time and frequency domain. However, the symbols for the DMRS for each UE, although mapped to the same resource elements, will be spread in accordance with different spreading schemes.

Figure 5:
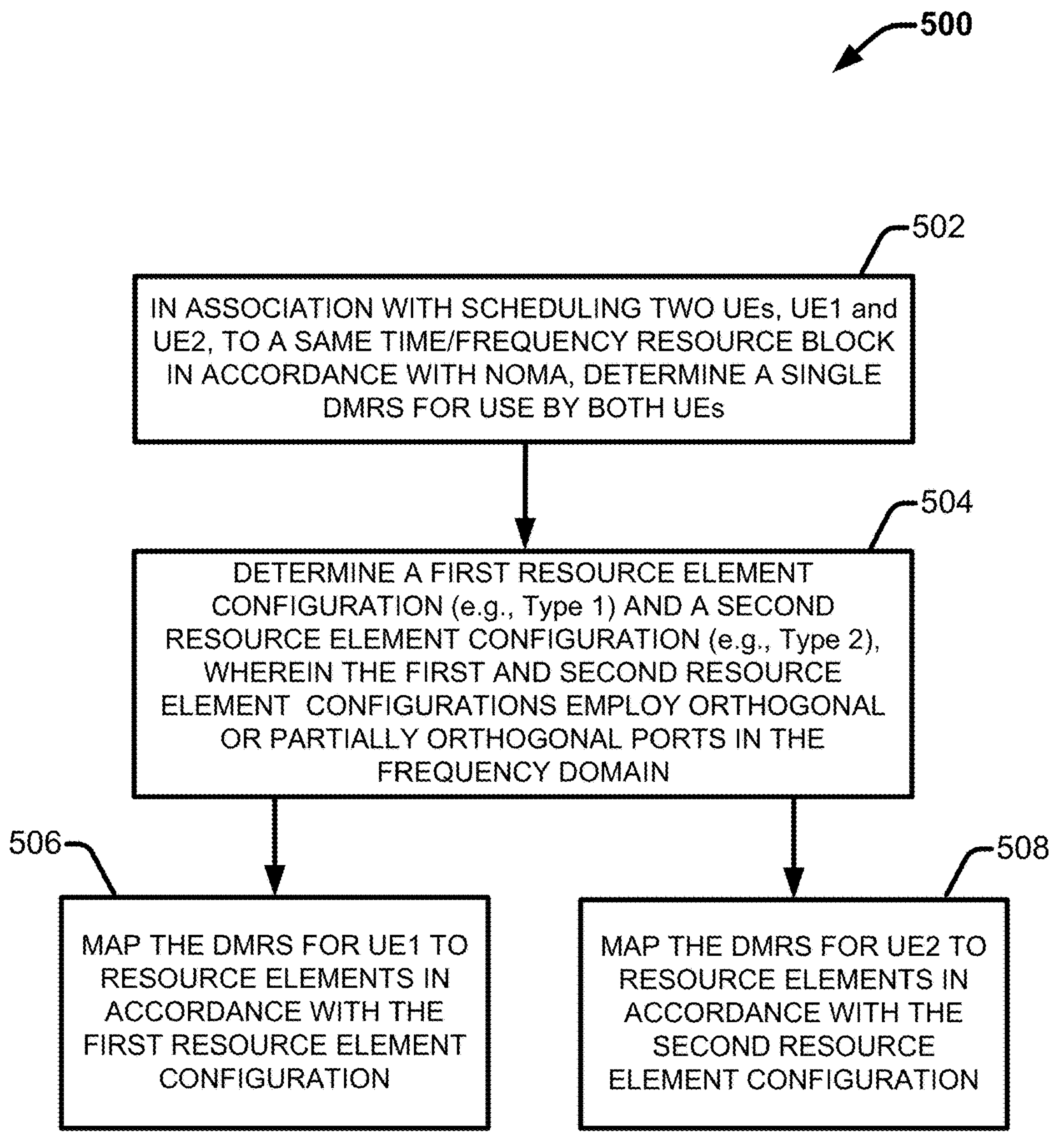
FIG. 5 presents a high-level flow diagram of another example method for reusing a same DMRS signal for two or more UEs while minimizing signal interference in accordance with a NOMA communication scheme, in accordance with various aspects and embodiments of the subject disclosure.

FIG. 5 presents an example method 500 for sharing a same DMRS between two or more UEs by using different resource element configurations for mapping the DMRS, in accordance with another embodiment. In accordance with this embodiment, the network node 104 can couple two UEs to the same resources elements within the same time domain by mapping the DMRS for a first UE, (e.g., UE1) using a first resource block configuration (e.g., Type-1 for example), and mapping the same DMRS for a second UE (e.g., UE2) using a second resource block configuration (e.g., Type 2 for example). In particular, with reference to method 500, at 502, in association with scheduling two UEs, UE1 and UE2, to a same time/frequency resource block in accordance with NOMA, the network node can determine (or select one from among the 12 defined in the 5G specification not currently being used by other UEs sharing the same resources), a single DMRS for use by both UEs. At 504, the network node can determine a first resource element configuration (e.g., the Type-1 configuration shown in FIG. 2) and a second resource element configuration (e.g., the Type-2 configuration shown in FIG. 3), wherein the first and second resource element configurations employ orthogonal or partially orthogonal ports in the frequency domain. Then at 506, the network node can map the DMRS for UE1 to resource elements in accordance with the first resource element configuration, and at 508, the network node can map the same DMRS for UE2 to resource elements in accordance with the second resource element configurations In accordance with this embodiment, both UEs can employ the same DMRS, yet map the DMRS to different and orthogonal (or substantially orthogonal) frequency ports.

Figure 6:
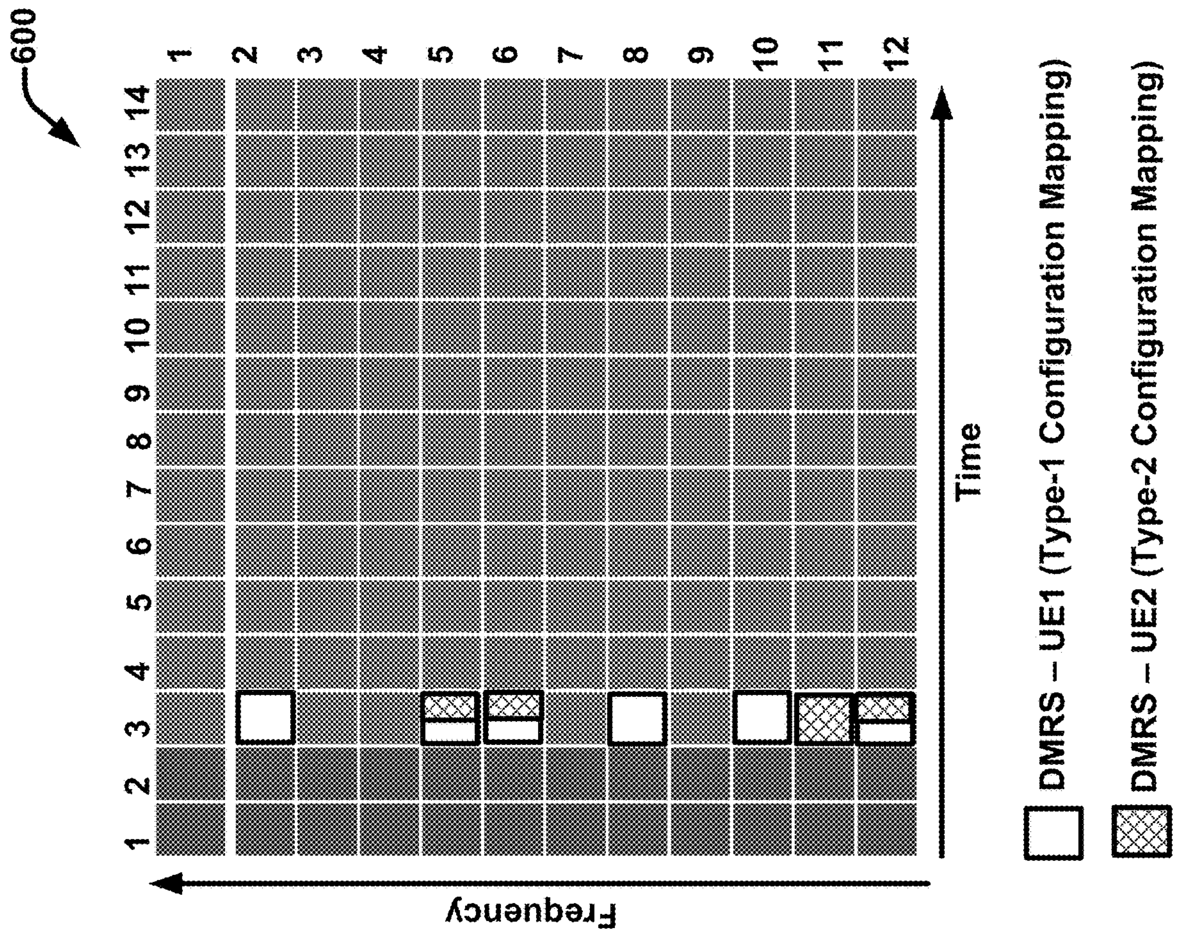
FIG. 6 is an illustration of another example resource block mapping scheme for demodulation reference signals (DMRS)s in accordance with various aspects and embodiments of the subject disclosure.

FIG. 6 provides an illustration of an example resource block mapping scheme 600 for a same DMRS used by two UEs in accordance with method 500. In the embodiment shown, hashing his used to distinguish the DMRS used by UE2 relative to UE1, however it should be appreciated that both UEs employ the same DMRS. In order to distinguish between the DMRSs respectively associated with each UE, the DMRS for UE1 is mapped to the resource elements in accordance with the Type-1 configuration (e.g., using 6 resource elements at positions, 12, 10, 8, 6, 5 and 2), and the DMRS for UE2 is mapped to the resource elements in accordance with the Type-2 configurations (e.g., using 4 resource elements at positions 12, 11, 5 and 6).

Figure 7:
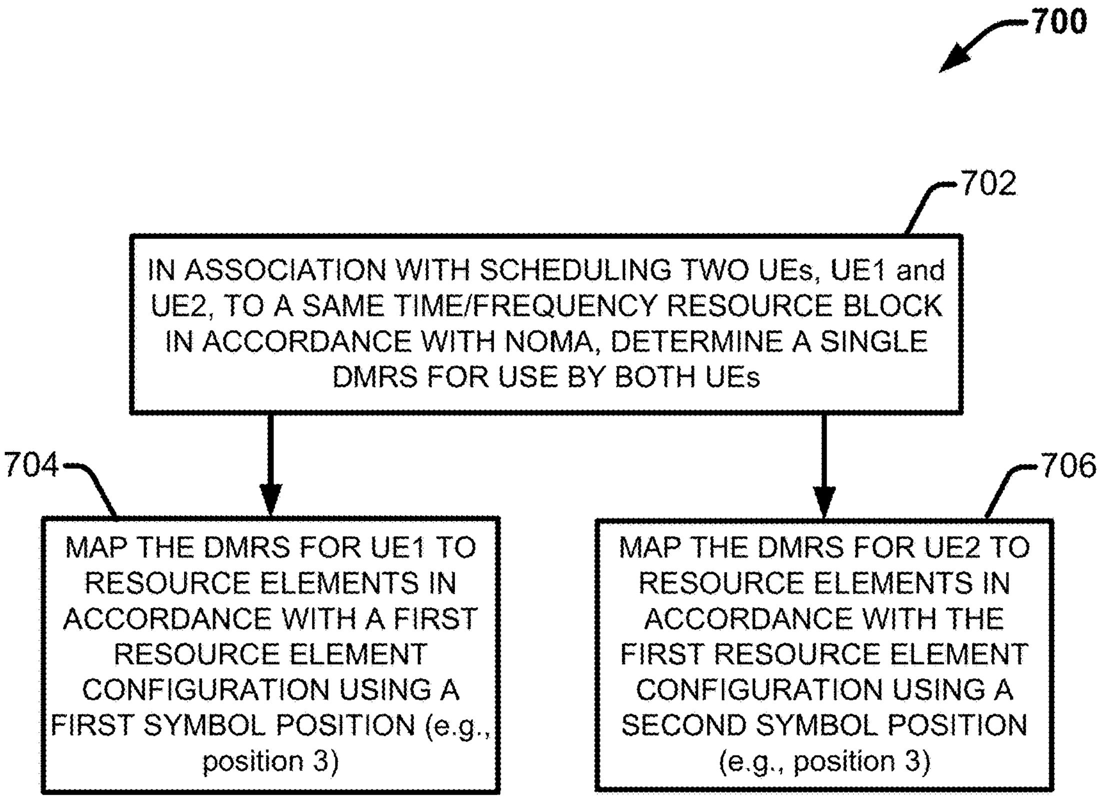
FIG. 7 presents a high-level flow diagram of another example method for reusing a same DMRS signal for two or more UEs while minimizing signal interference in accordance with a NOMA communication scheme, in accordance with various aspects and embodiments of the subject disclosure.

FIG. 7 presents another example method 700 for sharing a same DMRS between two or more UEs in association with a NOMA communication scheme in accordance with another embodiment. With this embodiment, the network node 104 can use the same DMRS for two UEs assigned to the same time/frequency resource, but change the position of the first symbol of the DMRS as used by each of the UEs such that DMRS interference is very minimal. For example, with reference to method 700, at 702 in association with scheduling two UEs, UE1 and UE2, to a same time/frequency resource block in accordance with NOMA, the network node can determine (or select one from among the 12 defined in the 5G specification not currently being used by other UEs sharing the same resources), a single DMRS for use by both UEs. At 704, the network node can map the DMRS for UE1 to resource elements in accordance with a first resource element configuration (e.g., Type-1 for example), using a first symbol position (e.g., position 3). At 706, the network node can map the DMRS for UE2 to resource elements in accordance with a first resource element configuration (e.g., Type-1 for example), using a second symbol position (e.g., position 4).

Figure 8:
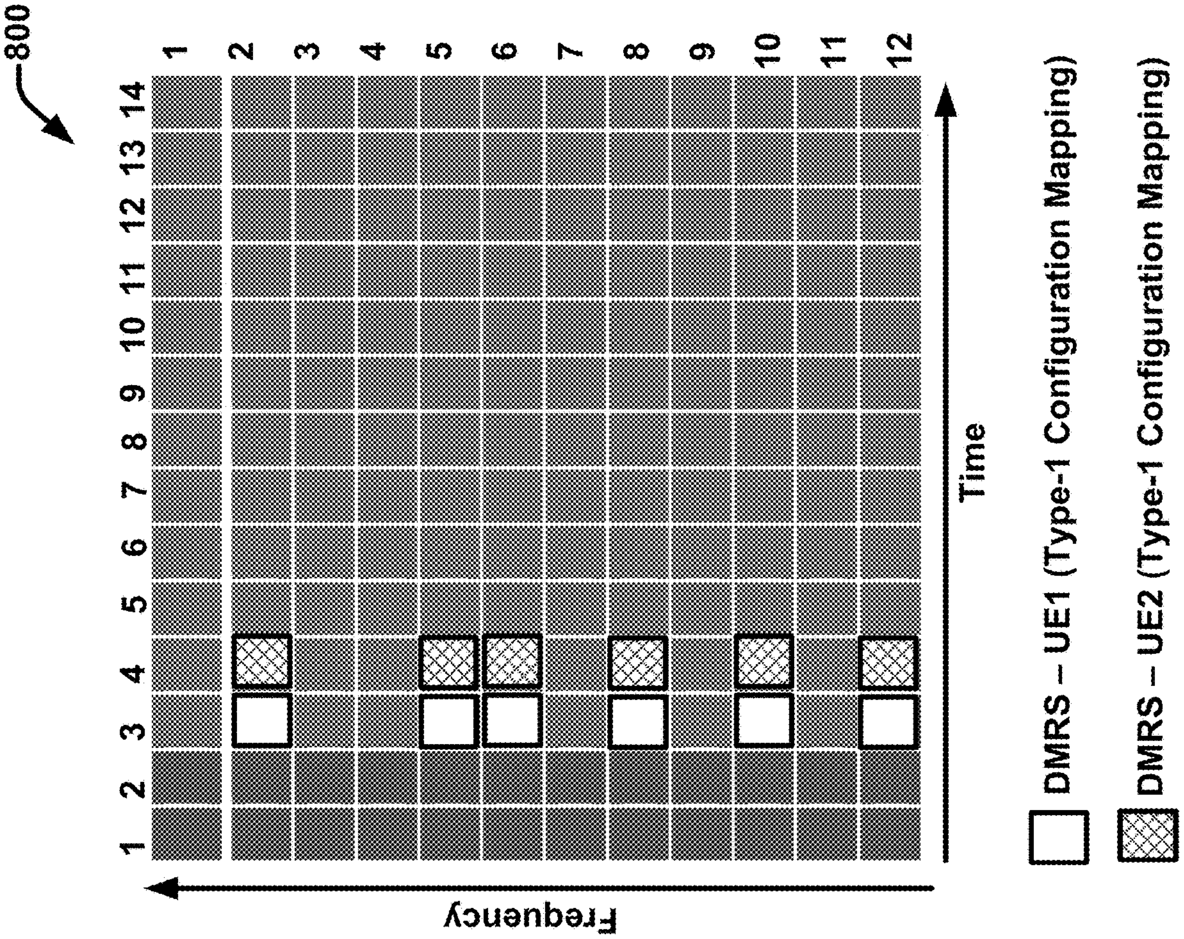
FIG. 8 is an illustration of another example resource block mapping scheme for demodulation reference signals (DMRS)s in accordance with various aspects and embodiments of the subject disclosure.

FIG. 8 provides an illustration of an example resource block mapping scheme 800 for a same DMRS used by two UEs in accordance with method 700. In the embodiment shown, hashing his used to distinguish the DMRS used by UE2 relative to UE1, however it should be appreciated that both UEs employ the same DMRS. In order to distinguish between the DMRSs respectively associated with each UE, the DMRS for UE1 is mapped to the resource elements in accordance with the Type-1 configuration (e.g., using 6 resource elements at positions, 12, 10, 8, 6, 5 and 2) at the symbol/time-slot position 3, and the DMRS for UE2 is mapped to the resource elements in accordance with the Type-1 configuration (e.g., using 6 resource elements at positions, 12, 10, 8, 6, 5 and 2) at the symbol/time-slot position 4.

Figure 9:
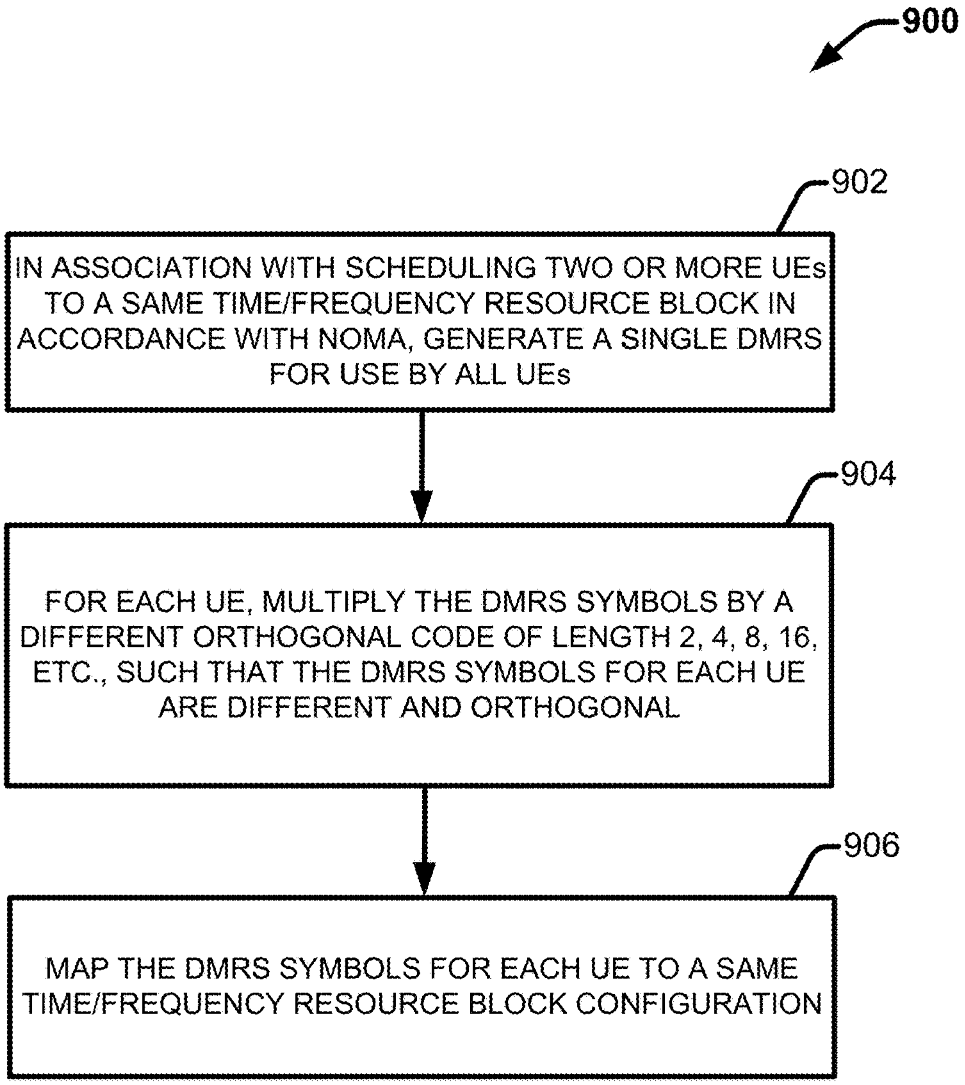
FIG. 9 presents a high-level flow diagram of another example method for reusing a same DMRS signal for two or more UEs while minimizing signal interference in accordance with a NOMA communication scheme, in accordance with various aspects and embodiments of the subject disclosure.

FIG. 9 presents another example method 900 for sharing a same DMRS between two or more UEs in association with a NOMA communication scheme in accordance with another embodiment. In accordance with this embodiment, the network node can multiply the DMRS symbols by an orthogonal code of length 2, 4, 8, 16, etc. such that the codes are orthogonal. For example, for a particular DMRS denoted as $\mathbf{r1}(n)$, a spreading code sequence $\mathbf{c1}(n)$ can be employed for a first UE1 that has a length of length 2, 4, 8, 16, or (another multiple), such that the resultant 'multiplied' DMRS signal is $Z\mathbf{1}(n)=\mathbf{r1}(n)\mathbf{c1}(n)$, where $\mathbf{c1}(n)$ is repeated such that the length of $\mathbf{c1}(n)$ is equal to $\mathbf{r1}(n)$. For another UE2, a different spreading code sequence $\mathbf{c2}(n)$ can be employed that has a different length, such that the resultant 'multiplied' DMRS signal is $Z\mathbf{2}(n)=\mathbf{r2}(n)\mathbf{c2}(n)$, wherein $\mathbf{c1}(n)$ and $\mathbf{c2}(n)$ are orthogonal. In another embodiment, the DMRS symbols can be extended, modified, or the like, such that cross-correlation between c1 and c2 can is very small if not orthogonal (e.g., relative to a threshold degree of cross-correlation. In this way, two or more UEs can use a same DMRS, yet with symbols multiplied by a different code length. With this embodiment, a single DMRS can be extended to accommodate many UEs (e.g., more than two).

In this regard, with reference to method 900, at 902, in association with scheduling two or more UEs to a same time/frequency resource block in accordance with NOMA, at 902 the network node (e.g., network node 104) can generate a single DMRS for use by all UEs (e.g., included in the group of two or more UEs assigned to the same time/frequency resources). At 904, for each UE, the network node can multiply the DMRS symbols by a different orthogonal code of length 2, 4, 8, 16, etc., such that the DMRS symbols for each UE are different and orthogonal. Then at 906, the network node can map the DMRS symbols for each UE to a same time/frequency resource block configuration 906.

With reference again to FIG. 1, in various embodiments described herein, the network node 104 can dynamically determine and direct UEs in the network to employ either OMA or NOMA. In association with directing two or more UEs to employ NOMA and assigning the respective UEs to shared time/frequency resources, the network node 104 can further determine DMRS parameters for the respective UEs that facilitates shared usage of the same DMRS in accordance with one or more of the techniques described herein. In this regard, the as described herein with reference to FIG. 4, such DMRS parameters can include different spreading codes for spreading the DMRS symbols in association with mapping the DMRS to a same set of time/frequency resources. In another example, the DMRS parameters can include different resource element configurations for mapping the same DMRS used by two or more UEs. In another example, the DMRS parameters can include different first symbol positions in the time domain for mapping a same DMRS used by two or more UEs in accordance with a same frequency domain configuration (e.g., both Type-1, both Type-2, etc.). In yet another example, the DMRS parameters can include different multipliers for use by respective UEs to generate similar DMRSs with varying orthogonal lengths.

The network node 104 can employ various techniques to facilitate instructing UEs regarding whether to use OMA or NOMA and if NOMA what DMRS parameters to employ. In some embodiments, because network load and the channel conditions change dynamically, the network node 104 can be configured to send the DMRS parameter information to UEs via the physical downlink control channel (PDCCH). In another embodiment, the network node 104 can employ radio resource control (RRC) signalling to indicate the spreading factor for DMRS and the spreading code for PUSCH.

Figure 10:
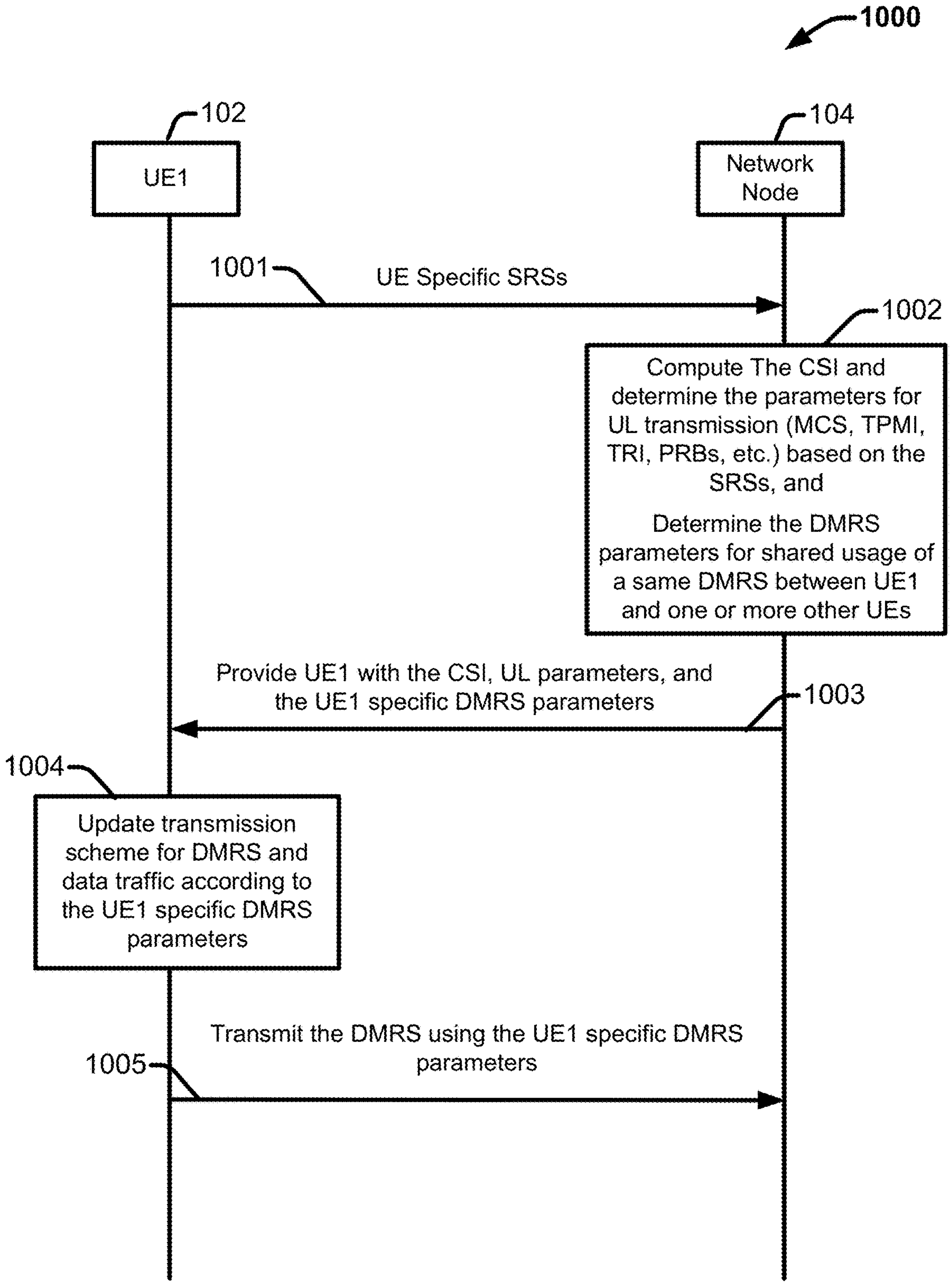
FIG. 10 presents an example signaling diagram illustrating application of DMRS sharing techniques in association with a NOMA communication scheme in accordance with various aspects and embodiments of the subject disclosure.

FIG. 10 presents an example signalling diagram 1000 illustrating application of the disclosed DMRS sharing techniques in association with a NOMA communication scheme in accordance with various aspects and embodiments of the subject disclosure. In this regard, signalling diagram 1000 demonstrates a messaging sequence for uplink data transfer for a system (e.g., system 100) configured to employ DMRS sharing techniques in conjunction with NOMA. Repetitive description of like elements employed in respective embodiments is omitted for sake of brevity.

At 1001, a UE1 102 can transmit UE specific sounding reference signals (SRS)s to the network node 104. The SRSs are a type of uplink reference signals that are specifically intended to be used by the network node 104 to acquire channel-state information (CSI) and beam specific information. In 5G systems, the SRSs are UE specific so they can have a significantly lower time/frequency density. At 1002, based on the SRSs, the network node 104 can compute the channel estimates then computes the parameters needed for CSI determination. This determination step can also involve determining the parameters for uplink (UL) transmission, such as the coding scheme (MCS), the transmit precoding matrix index (TPMI), transmit rank information (TRI), the physical resource blocks, etc. In addition, at 1002, the network node 104 can cluster the UE1 with one or more additional UEs in accordance with a NOMA transmission scheme. In this regard, the network node 104 can assign the respective UEs to a same time/frequency resource and further determine the DMRS parameters for shared usage of a same DMRS between UE1 and one or more other UEs.

At 1003, the network node 104 can provide the UEs with the CSI information, the UL parameters and the UE1 specific DMRS parameters. In some embodiments, the network node 104 can send the DMRS information via the PDCCH. At 1004, the UE 102 can update its transmission scheme for the DMRS and the data traffic according to the UE1 specific DMRS parameters. Then at 1005, the UE 102 can transmit the DMRS using the UE1 specific DMRS parameters.

Figure 11:
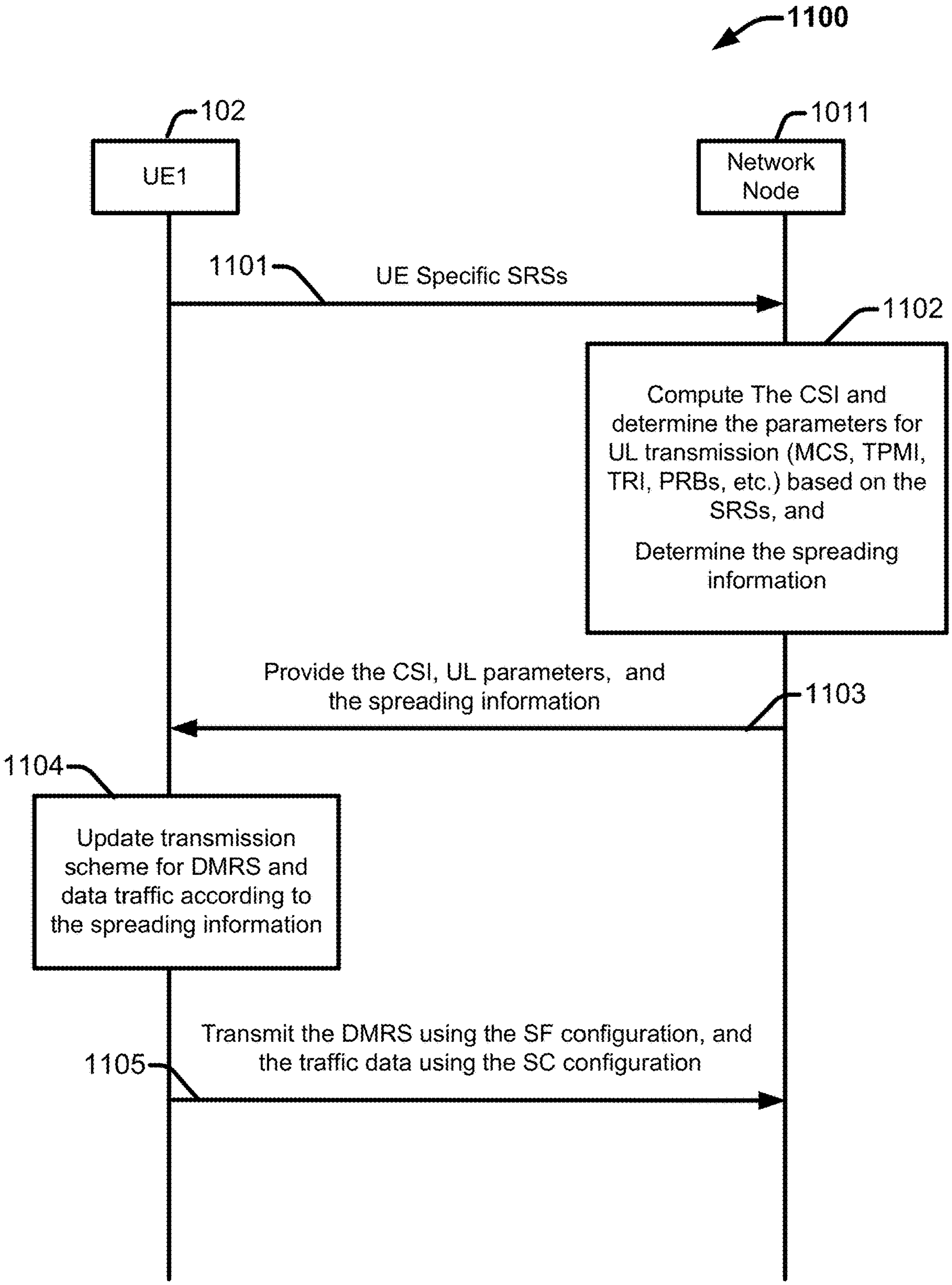
FIG. 11 presents an example signaling diagram illustrating application of DMRS sharing techniques via spreading of the DMRS in according with spreading codes determined for the respective UEs in association with a NOMA communication scheme in accordance with various aspects and embodiments of the subject disclosure.

FIG. 11 presents an example signalling diagram 1100 illustrating application of DMRS sharing techniques via spreading of the DMRS in according with spreading codes determined for the respective UEs in association with a NOMA communication scheme in accordance with various aspects and embodiments of the subject disclosure. In this regard, signalling diagram 1100 demonstrates a messaging sequence for uplink data transfer for a system (e.g., system 100) configured to employ the DMRS spreading techniques described with reference to FIG. 4 in conjunction with NOMA. Repetitive description of like elements employed in respective embodiments is omitted for sake of brevity.

In one or more embodiments, the information defining how a UE should spread its DMRS is referred herein as the spreading factor. A spreading code (e.g., c1(*n*), c2(*n*), etc.) refers to the code domain spreading scheme for the data traffic. The spreading factor and/or the spreading code can be referred to herein as collectively or individually as spreading information. In various embodiments, the network node 104 can determine the spreading information for a cluster of two or more UEs 102 assigned to the same time/frequency resource. The network node 104 can further transmit the spreading information determined for each UE to the respective UEs. Based on reception of the spreading information by a UE 102, the UE can change its transmission scheme accordingly and proceed to transmits data. In this regard, the UE 102 can apply the spreading information and code uplink transmissions by spreading the data traffic according to the spreading code and spreading the DMRS according to the spreading factor.

In this regard, with reference to FIG. 11, at 1101, a UE 102 can transmit UE specific sounding reference signals (SRS)s to the network node 104. The SRSs are a type of uplink reference signals that are specifically intended to be used by the network node 104 to acquire channel-state information (CSI) and beam specific information. In 5G systems, the SRSs are UE specific so they can have a significantly lower time/frequency density. At 1102, based on the SRSs, the network node 104 can compute the channel estimates then computes the parameters needed for CSI determination. This determination step can also involve determining the parameters for uplink (UL) transmission, such as the coding scheme (MCS), the transmit precoding matrix index (TPMI), transmit rank information (TRI), the physical resource blocks, etc. In addition, at 1102, the network node 104 can cluster the UE with one or more additional UEs in accordance with a NOMA transmission scheme. In this regard, the network node 104 can assign the respective UEs to a same time/frequency resource and further determine the spreading information for the DMRS and the traffic data. This can include, for each UE determining the spreading factor (SF) for the DMRS and the spreading code (SC) for the traffic data.

At 1103, the network node 104 can provide the UE with the CSI information, the UL parameters and the spreading information. In some embodiments, the network node 104 can send the spreading information via the PDCCH. At 1104, the UE 102 can update its transmission scheme for the DMRS and the data traffic according to the spreading information. Then at 1105, the UE 102 can transmit the DMRS using the SF configuration and the traffic data using the SC configuration.

The disclosed techniques can significantly improve 5G network capacity as UEs are multiplexed on the same resources. In addition, the network node 104 can optimize performance based on the current network conditions and predicted network conditions (e.g., predicted peak traffic times, predicted low traffic times, etc.) by switching UEs between NOMA and OMA. Further, by using the compact downlink control channel to indicate which transmission scheme the UEs are to use reduces the overhead of the control channel.

Figure 12:
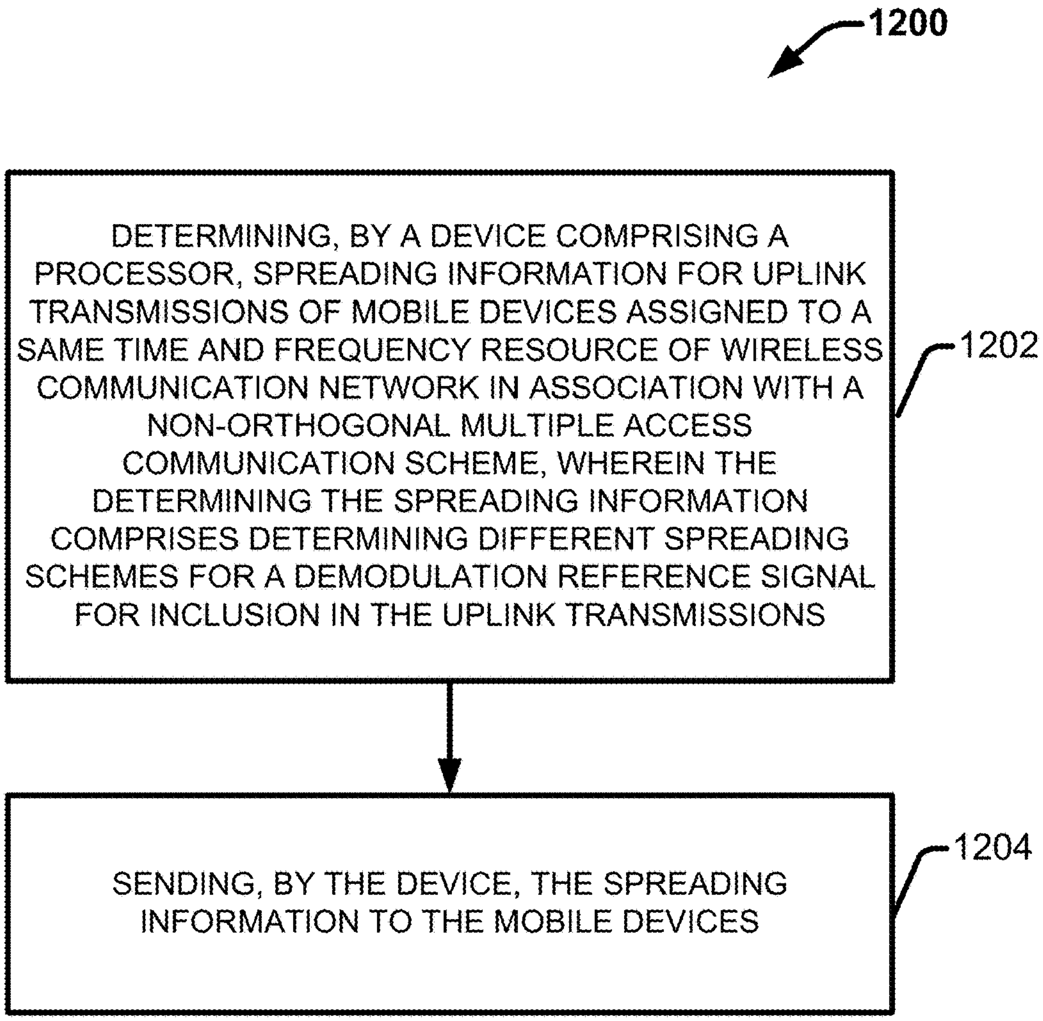
FIG. 12 illustrates an example method for using DMRS spreading techniques in association with a NOMA communication scheme in accordance with various aspects and embodiments of the subject disclosure.
Figure 13:
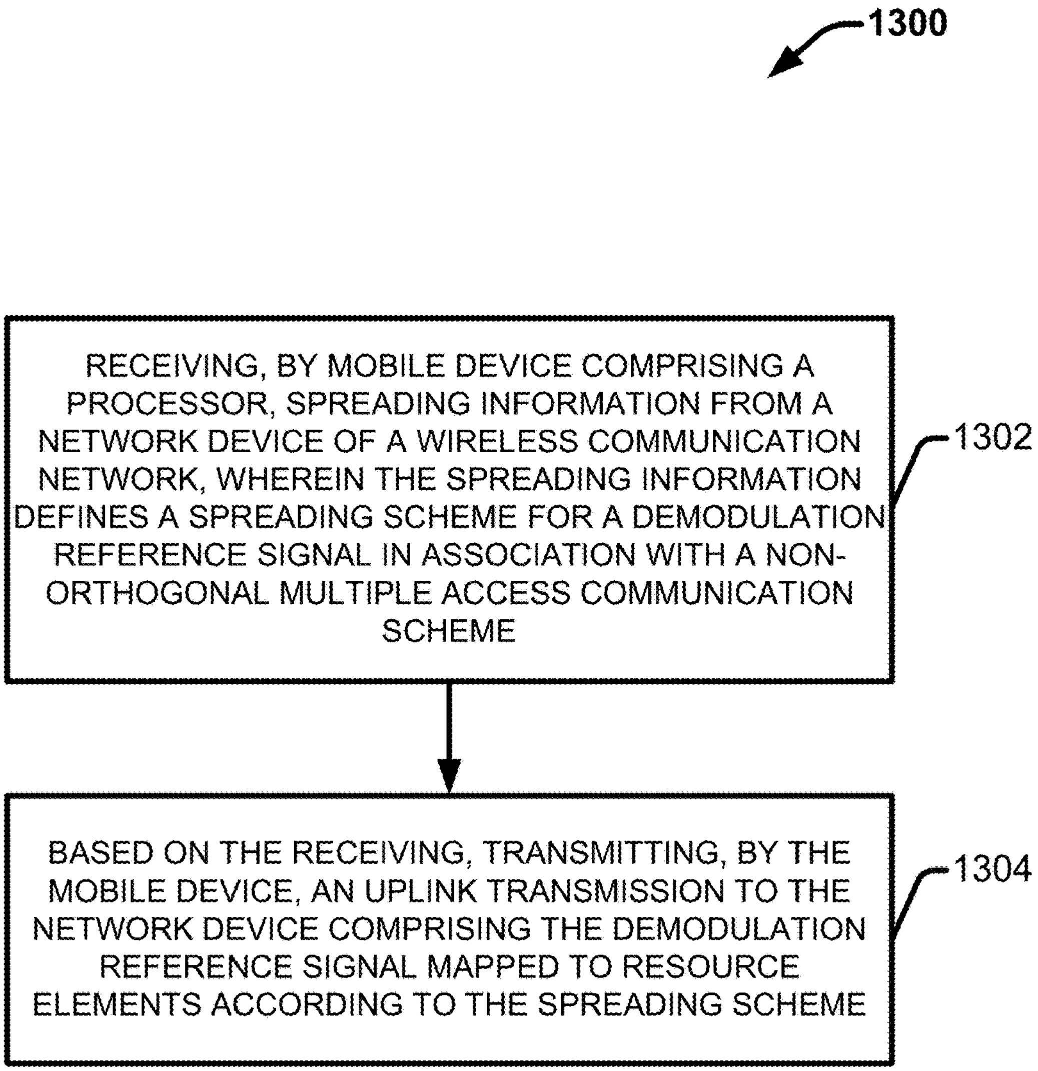
FIG. 13 illustrates another example method for using DMRS spreading techniques in association with a NOMA communication scheme in accordance with various aspects and embodiments of the subject disclosure.

In view of the example system(s) described above, example method(s) that can be implemented in accordance with the disclosed subject matter can be better appreciated with reference to flowcharts in FIGS. 12-13. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 12 illustrates an example method 1200 for using DMRS spreading techniques in association with a NOMA communication scheme in accordance with various aspects and embodiments of the subject disclosure. Repetitive description of like elements employed in respective embodiments is omitted for sake of brevity.

At 1202, a device comprising a processor (e.g., network node 104), determines spreading information for uplink transmissions of mobile devices assigned to a same time and frequency resource of wireless communication network in association with a non-orthogonal multiple access (NOMA) communication scheme, wherein the determining the spreading information comprises determining different spreading schemes for a demodulation reference signal for inclusion in the uplink transmissions. In this regard, the mobile devices can include two or more mobile devices and at least two of the mobile devices will be assigned the same demodulation reference signal. However, the demodulation reference signal will be configured for the respective mobile devices according to different spreading schemes. At 1204, the device then sends the spreading information to the mobile devices. In this regard, each of the mobile devices will receive different spreading information.

FIG. 13 illustrates an example method 1300 for using DMRS spreading techniques in association with a NOMA communication scheme in accordance with various aspects and embodiments of the subject disclosure. Repetitive description of like elements employed in respective embodiments is omitted for sake of brevity.

At 1302, a mobile device comprising a processor (e.g., a UE 102) receives spreading information from a network device (e.g., network node 104) of a wireless communication network (e.g., system 100), wherein the spreading information defines a spreading scheme for a demodulation reference signal in association with a non-orthogonal multiple access (NOMA) communication scheme. At 1304, based on the receiving, the mobile device transmits an uplink transmission to the network device comprising the demodulation reference signal mapped to resource elements according to the spreading scheme.

Figure 14:
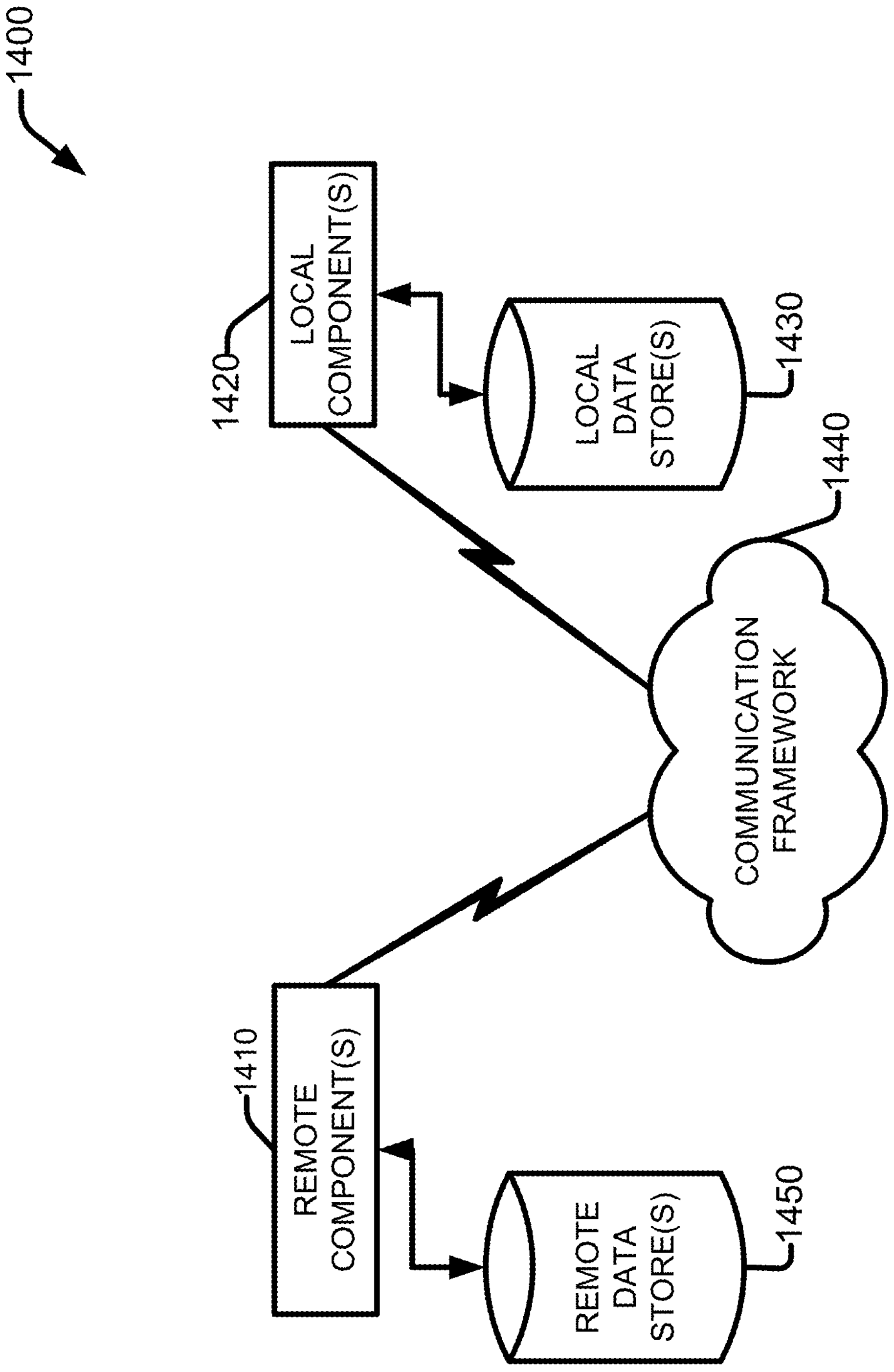
FIG. 14 depicts an example schematic block diagram of a computing environment with which the disclosed subject matter can interact.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can comprise servers, personal servers, wireless telecommunication network devices, RAN device(s), etc. As an example, remote component(s) 1410 can be network node 104, one or more devices included in the communication service provider networks 106, and the like. The system 1400 also comprises one or more local component(s) 1420. The local component(s) 1420 can be hardware and/or software (e.g., threads, processes, computing devices). In some embodiments, local component(s) 1420 can comprise, for example, a UE 102, one or more components of the UE 102, and the like etc.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via an LTE network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
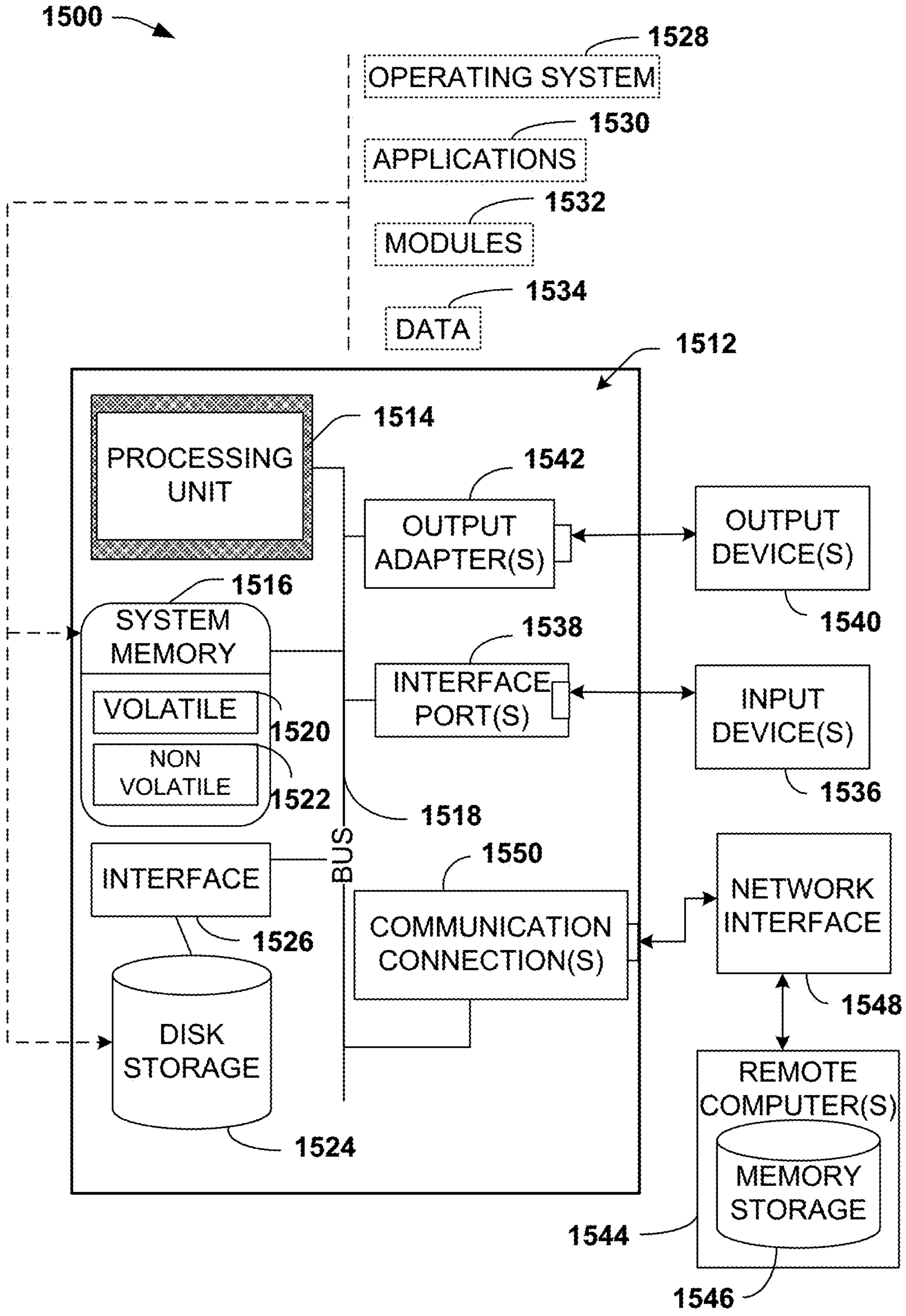
FIG. 15 illustrates an example block diagram of a computing system operable to execute the disclosed systems and methods in accordance with an embodiment.

In order to provide a context for the various aspects of the disclosed subject matter, FIG. 15, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1520 (see below), nonvolatile memory 1522 (see below), disk storage 1524 (see below), and memory storage 1546 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 15 illustrates a block diagram of a computing system 1500 operable to execute the disclosed systems and methods in accordance with an embodiment. Computer 1512, which can be, for example, a UE (e.g., UE 102), a network node (e.g., network node 104), or the like, can comprise a processing unit 1514, a system memory 1516, and a system bus 1518. System bus 1518 couples system components comprising, but not limited to, system memory 1516 to processing unit 1514. Processing unit 1514 can be any of various available processors. Dual microprocessors and other multiprocessor architectures also can be employed as processing unit 1514.

System bus 1518 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 15164), and small computer systems interface.

System memory 1516 can comprise volatile memory 1520 and nonvolatile memory 1522. A basic input/output system, containing routines to transfer information between elements within computer 1512, such as during start-up, can be stored in nonvolatile memory 1522. By way of illustration, and not limitation, nonvolatile memory 1522 can comprise read only memory, programmable read only memory, electrically programmable read only memory, electrically erasable read only memory, or flash memory. Volatile memory 1520 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1512 can also comprise removable/non-removable, volatile/non-volatile computer storage media. FIG. 15 illustrates, for example, disk storage 1524. Disk storage 1524 comprises, but is not limited to, devices like a magnetic disk drive, floppy disk drive, tape drive, flash memory card, or memory stick. In addition, disk storage 1524 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1524 to system bus 1518, a removable or non-removable interface is typically used, such as interface 1526.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 15 describes software that acts as an intermediary between users and computer resources described in suitable operating environment 1500. Such software comprises an operating system 1528. Operating system 1528, which can be stored on disk storage 1524, acts to control and allocate resources of computer system 1512. System applications 1530 take advantage of the management of resources by operating system 1528 through program modules 1532 and program data 1534 stored either in system memory 1516 or on disk storage 1524. It is to be noted that the disclosed subject matter can be implemented with various operating systems or combinations of operating systems.

A user can enter commands or information into computer 1512 through input device(s) 1536. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1512. Input devices 1536 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1514 through system bus 1518 by way of interface port(s) 1538. Interface port(s) 1538 comprise, for example, a serial port, a parallel port, a game port, a universal serial bus, an infrared port, a Bluetooth port, an IP port, or a logical port associated with a wireless service, etc. Output device(s) 1540 use some of the same type of ports as input device(s) 1536.

Thus, for example, a universal serial bus port can be used to provide input to computer 1512 and to output information from computer 1512 to an output device 1540. Output adapter 1542 is provided to illustrate that there are some output devices 1540 like monitors, speakers, and printers, among other output devices 1540, which use special adapters. Output adapters 1542 comprise, by way of illustration and not limitation, video and sound cards that provide means of connection between output device 1540 and system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. Remote computer(s) 1544 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1512. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers, which can leverage an economy of scale and can view accessing computing resources via a cloud service in a manner similar to a subscribing to an electric utility to access electrical energy, a telephone utility to access telephonic services, etc.

For purposes of brevity, only a memory storage device 1546 is illustrated with remote computer(s) 1544. Remote computer(s) 1544 is logically connected to computer 1512 through a network interface 1538 and then physically connected by way of communication connection 1550. Network interface 1548 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1550 refer(s) to hardware/software employed to connect network interface 1548 to bus 1518. While communication connection 1550 is shown for illustrative clarity inside computer 1512, it can also be external to computer 1512. The hardware/software for connection to network interface 1548 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signalling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signalling-stream to and from a set of subscriber stations or provider enabled devices. Data and signalling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and post-paid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:

a processor; and a memory that stores executable instructions that, when executed by the processor, facilitate performance of operations, comprising:

scheduling devices to use a same demodulation reference signal based on the devices being scheduled to use same network resource elements in association with communicating with network equipment according to a non-orthogonal multiple access communication protocol and based on a number of the devices exceeding a restricted number of demodulation reference signals;

determining different spreading configurations applicable to spreading the same demodulation reference signal over the same network resource elements by the devices, wherein the determining comprises determining different resource element configurations for mapping the same demodulation reference signal to the same network resource elements, wherein the different resource element configurations comprise a first resource element configuration in which symbols of the same demodulation reference signal are mapped to a first subset of the network resource elements and a second resource element configuration in which symbols of the same demodulation reference signal are mapped to a second subset of the network resource elements, and wherein the first subset and the second subset are all within a same symbol position and include multiple frequency resource elements in common; and sending configuration information to the devices identifying the same demodulation reference signal and some or all of the different spreading configurations.

2. The system of claim 1, the operations further comprising:

directing each of the devices to transmit the same demodulation reference signal to the network equipment using one of the different spreading configurations.

3. The system of claim 2, wherein the devices comprise a first device and a second device, wherein the different spreading configurations comprise a first spreading code and a second spreading code, and wherein the directing comprises:

directing the first device to spread the same demodulation reference signal using the first spreading code, resulting in a first spread signal, and map symbols of the first spread signal to the first subset; and directing the second device to spread the same demodulation reference signal using the second spreading code, resulting in a second spread signal, and map symbols of the second spread signal to the second subset.

4. The system of claim 3, wherein the first spreading code and the second spreading code are orthogonal to one another.

5. The system of claim 1, wherein the different spreading configurations are determined to result in respective transmissions of the same demodulation reference signal by the devices.

6. The system of claim 1, wherein the different spreading configurations are determined to result in respective transmissions of the same demodulation reference signal by the devices being partially orthogonal to one another.

7. The system of claim 1, wherein the first subset and the second subset each includes consecutive frequency resource elements.

8. The system of claim 1, wherein the first subset includes frequency resource elements that are separated from one another by at least one other frequency resource element.

9. The system of claim 1, wherein determining the different spreading configurations comprises determining different orthogonal codes, for respective multiplications of the same demodulation reference signal by the devices, and wherein the respective multiplications of the same demodulation reference signal by the devices result in respective transmissions of the same demodulation reference signal by the devices being partially orthogonal to one another and not completely orthogonal to one another.

10. The system of claim 9, wherein the different orthogonal codes have different lengths.

11. A method, comprising:

assigning, by network equipment comprising a processor, devices to a same demodulation reference signal based on the devices being assigned to same network resource elements in association with communicating with the devices according to a non-orthogonal multiple access communication protocol and based on a number of the devices exceeding a limited number of demodulation reference signals;

determining, by the network equipment, different spreading configurations applicable to spreading the same demodulation reference signal with respect to the same network resource elements by the devices, wherein the determining comprises determining different resource element configurations for mapping the same demodulation reference signal to the same network resource elements, wherein the different resource element configurations comprise a first resource element configuration in which symbols of the same demodulation reference signal are mapped to a first subset of the network resource elements and a second resource element configuration in which symbols of the same demodulation reference signal are mapped to a second subset of the network resource elements, and wherein the first subset and the second subset are all within a same symbol position and include multiple frequency resource elements in common; and causing, by the network equipment, configuration information to be transmitted to the devices identifying the same demodulation reference signal and some or all of the different spreading configurations.

12. The method of claim 11, further comprising:

directing, by the network equipment, the devices to transmit the same demodulation reference signal to the network equipment using the different spreading configurations.

13. The method of claim 12, wherein the devices comprise a first device and a second device, wherein the different spreading configurations comprise a first spreading code and a second spreading code, and wherein the directing comprises:

directing the first device to spread the same demodulation reference signal using the first spreading code, resulting in a first spread signal, and map the first spread signal to the first subset; and directing the second device to spread the same demodulation reference signal using the second spreading code, resulting in a second spread signal, and map the second spread signal to the second subset.

14. The method of claim 13, wherein the first spreading code and the second spreading code are orthogonal to one another.

15. The method of claim 11, wherein the different spreading configurations are determined to result in respective transmissions of the same demodulation reference signal by the devices.

16. The method of claim 11, wherein the different spreading configurations are determined to result in respective transmissions of the same demodulation reference signal by the devices being partially orthogonal to one another.

17. The method of claim 11, wherein the first subset and the second subset each includes consecutive frequency resource elements.

18. The method of claim 11, wherein the first subset includes frequency resource elements that are separated from one another by at least one other frequency resource element.

19. A non-transitory machine-readable medium, comprising executable instructions that, when executed by a processor of network equipment, facilitate performance of operations, comprising:

based on devices being assigned to communicate using same network resource elements according to a non-orthogonal multiple access communication protocol and based on a number of the devices exceeding a specified number of demodulation reference signals, assigning the devices to communicate using a same demodulation reference signal;

determining different spreading configurations applicable to spreading the same demodulation reference signal with respect to the same network resource elements by the devices, wherein the determining comprises determining different resource element configurations for mapping the same demodulation reference signal to the same network resource elements, wherein the different resource element configurations comprise a first resource element configuration in which symbols of the same demodulation reference signal are mapped to a first subset of the network resource elements and a second resource element configuration in which symbols of the same demodulation reference signal are mapped to a second subset of the network resource elements, and wherein the first subset and the second subset are all within a same symbol position and include multiple frequency resource elements in common; and sending configuration information to the devices identifying the same demodulation reference signal and the different spreading configurations.

20. The non-transitory machine-readable medium of claim 19, wherein the different spreading configurations are determined to result in respective transmissions of the same demodulation reference signal by the devices being at least partially orthogonal to one another.

* * * * *